United States Patent

Milicevic et al.

(10) Patent No.: US 9,994,480 B2
(45) Date of Patent: Jun. 12, 2018

(54) METHOD FOR ETCHING A PRIMARY PREFORM

(71) Applicant: Draka Comteq B.V., Amsterdam (NL)

(72) Inventors: Igor Milicevic, Helmond (NL); Mattheus Jacobus Nicolaas Van Stralen, Tilburg (NL); Gertjan Krabshuis, Sint Oedenrode (NL); Johannes Antoon Hartsuiker, Eindhoven (NL)

(73) Assignee: Draka Comteq, B.V., Amsterdam (NL)

( * ) Notice: Subject to any disclaimer, the term of this patent is extended or adjusted under 35 U.S.C. 154(b) by 90 days.

(21) Appl. No.: 15/293,715

(22) Filed: Oct. 14, 2016

(65) Prior Publication Data

US 2017/0107143 A1 Apr. 20, 2017

(30) Foreign Application Priority Data

Oct. 16, 2015 (NL) .................................... 1041529

(51) Int. Cl.
*C03C 15/02* (2006.01)
*C03B 37/018* (2006.01)

(52) U.S. Cl.
CPC ............ *C03C 15/02* (2013.01); *C03B 37/018* (2013.01)

(58) Field of Classification Search
CPC .... C23C 16/01; C23C 16/402; C03B 37/0183
See application file for complete search history.

(56) References Cited

U.S. PATENT DOCUMENTS

| | | | |
|---|---|---|---|
| 5,000,771 A * | 3/1991 | Fleming, Jr. ...... | C03B 37/01205 216/67 |
| 6,253,580 B1 * | 7/2001 | Gouskov ........... | C03B 37/01205 65/391 |
| 7,591,957 B2 * | 9/2009 | Carr ....................... | B23K 1/206 216/24 |
| 7,722,777 B2 | 5/2010 | Fletcher, III et al. | |
| 8,779,322 B2 * | 7/2014 | Holber ............... | H01J 37/32174 219/121.41 |
| 2016/0152509 A1 | 6/2016 | Milicevic et al. | |
| 2016/0186316 A1 | 6/2016 | Milicevic et al. | |
| 2017/0107143 A1 | 4/2017 | Milicevic et al. | |

FOREIGN PATENT DOCUMENTS

| | | |
|---|---|---|
| EP | 3156378 A1 | 4/2017 |
| JP | 58-79835 A | 5/1983 |
| WO | 2015/002530 A1 | 1/2015 |

OTHER PUBLICATIONS

Search Report and Written Opinion in counterpart European Application No. 16190769 dated Mar. 17, 2017, pp. 1-5 [U.S. Pat. Nos. 5,000,771 & 7,722,777 previously cited.].
Search Report in counterpart Dutch Application No. 1041529 dated Apr. 19, 2016, pp. 1.

* cited by examiner

*Primary Examiner* — Nahida Sultana
(74) *Attorney, Agent, or Firm* — Additon, Higgins & Pendleton, P.A.

(57) ABSTRACT

The present invention relates in a first aspect to a method for etching a primary preform or core rod. The present invention moreover relates in a second aspect to the etched primary preform thus obtained and moreover to a final preform and optical fibers obtained therefrom and to a method of preparing optical fibers therefrom.

20 Claims, 2 Drawing Sheets

METHOD FOR ETCHING A PRIMARY PREFORM

CROSS-REFERENCE TO PRIORITY APPLICATION

This application claims the benefit of pending Dutch Application No. 1041529 (filed Oct. 16, 2015, at the Dutch Patent Office), which is hereby incorporated by reference in its entirety.

FIELD OF THE INVENTION

The present invention relates to the field of optical fibers, particularly the field of manufacturing optical fibers by means of chemical vapor deposition (CVD) in which layers of silica (e.g., undoped or doped) are deposited on a substrate, such as modified chemical vapor deposition (MCVD), plasma enhanced chemical vapor deposition (PECVD or PCVD), outside vapor deposition (OVD), and Axial Vapor Deposition (AVD or VAD).

BACKGROUND

Using an optical fiber for telecommunication requires that the optical fiber is substantially free from defects (e.g., discrepancies in the percentage of dopants, undesirable cross-sectional ellipticity, and the like), because, when considered over a large length of the optical fiber, such defects may cause a significant attenuation of the signal being transmitted. It is important, therefore, to achieve a uniform and reproducible process.

A process to manufacture optical fibers generally includes the following steps, although other steps may be present or one or more steps may be omitted: Step 1) preparation of primary preform; step 2) cleaning of primary preform; step 3) preparation of final preform; and step 4) drawing of optical fibers. These steps are discussed in more detail (below).

In the second step (above), the step to which the method according to the present invention substantially relates, the outer surface of a primary preform or core rod is cleaned to remove surface impurities. Conventionally, there are two main methods for cleaning the outer surface of the primary preform. First, heat treatment (e.g., fire polishing to evaporate part of the outer surface) may be used. Second, chemical processing using an etching technique, conventionally wet etching (e.g., with hydrofluoric acid), may be used. Either of these processes (heat treatment or wet etching) may produce unwanted surface irregularities, and both are time consuming.

U.S. Pat. No. 5,000,771, which is hereby incorporated by reference in its entirety, discloses the removal of imperfections, such as bubbles and air lines, from the preform surface by contacting the preform surface with a substantial portion of the electrically conducting plasma region (the plasma fireball) extending from a plasma torch.

U.S. Pat. No. 7,722,777, which is hereby incorporated by reference in its entirety, discloses a method of cleaning core rods by use of an etching fluid, such as HF acid (wet etching).

The prior art methods for cleaning the outside surface of the primary preform are time consuming and can cause unwanted surface irregularities. Therefore, there is a need for an improved cleaning method that achieves primary preforms having a reduced outside contamination content, whereby the cleaned primary preforms are suitable for a subsequent process step.

SUMMARY

Accordingly, the present invention embraces a method for cleaning the outer surface of a primary preform to achieve reduced outer-surface contamination. The present invention further embraces a process that provides improved primary-preform quality without the need of extensive modification to the apparatuses used. One or more of these objects are achieved in accordance with the present invention by an outside etching process.

In a first aspect, the present invention relates to a method for etching a primary preform or core rod. In a second aspect, the present invention relates to the etched primary preform thus obtained, to a final preform and optical fibers obtained therefrom, and to a method of preparing optical fibers therefrom.

The present invention relates to a method for etching a primary preform, the method comprising the steps of (i) introducing the primary preform having an outer diameter $OD_{PP}$ into the central cavity of a hollow etching tube having an outer diameter $OD_{ET}$ and an inner diameter $ID_{ET}$ such that in angular direction a part of the outer surface of the primary preform contacts a part of the inner surface of the etching tube, thereby forming an open region between a remaining part of the outer surface of the primary preform and a remaining part of the inner surface of the etching tube; (ii) mounting the etching tube with the primary preform inserted in its central cavity on a lathe and introducing the etching tube into a central aperture of an applicator mounted on the lathe, wherein the applicator and the etching tube are moved in axial direction with respect to each other; (iii) rotating the etching tube around its axis thereby causing a counter rotation of the primary preform within the etching tube; and (iv) coupling electromagnetic radiation into the applicator and creating within a part of the etching tube that is surrounded by the applicator a plasma that moves in translation back and forth over the length of the etching tube during one or more passes, wherein during at least a part of at least one pass the outside of the primary preform is etched by supplying a fluorine-containing etching gas to the open region in order to obtain an etched primary preform.

In one embodiment, the difference between the outer diameter of the primary preform $OD_{PP}$ and the inner diameter of the etching tube $ID_{ET}$ (i.e., $ID_{ET}-OD_{PP}$) is at least 4 millimeters, such as at least 6 millimeters. In another embodiment, the process includes at least ten passes, such as between 50 and 200 passes of the plasma. In yet another embodiment, the fluorine-containing etching gas is supplied during at least part of at least one pass, typically during the complete pass(es) of the plasma. In yet another embodiment, the fluorine-containing etching gas includes $CCl_2F_2$, $CF_4$, $C_2F_6$, $C_4F_8$, $SF_6$, $NF_3$, $SO_2F_2$, $CHF_3$, $CClF_3$, $CCl_3F$, and one or more combinations of these gases, and is typically $C_2F_6$. In yet another embodiment, the fluorine-containing etching gas includes a fluorine-containing gas mixed with one or more carrier gases, typically argon and/or oxygen, more typically oxygen. In yet another embodiment, the applicator and the etching tube are moved in axial direction with respect to each other with a translation speed of movement of between 5 and 40 meters/second, more typically between 10 and 30 meters/second, such as 20 meters/second. In yet another embodiment, the rotation of the etching tube is a continuous rotation or a stepwise rotation, typically a stepwise rotation. In yet another embodiment, the rotation speed of the etching tube is such that there are between 0.1 to 2 rotations per pass of the plasma. In yet another embodiment, the etching tube is a silica tube, typically a quartz tube. In yet another embodiment, the power of the electromagnetic radiation is between 3 and 10 kilowatts (kW), such as between 5 kW and 8 kW. In yet another embodiment, the etching tube has a length $L_{ET}$, the primary preform has a length $L_{PP}$, and $L_{PP}<L_{ET}$.

In another aspect, the present invention relates to an etched primary preform obtained by or obtainable by a method according to the invention.

In yet another aspect, the present invention relates to a method of manufacturing an optical fiber by preparing a final preform from the primary preform according to the present invention by increasing its diameter through the application of an external layer of silica.

In yet another aspect, the present invention relates to a method of manufacturing an optical fiber by preparing a final preform from the primary preform according to the present invention and subsequently drawing the final preform into an optical fiber.

In yet another aspect, the present invention relates to an optical fiber obtained by or obtainable by the method of manufacturing an optical fiber according to the invention.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
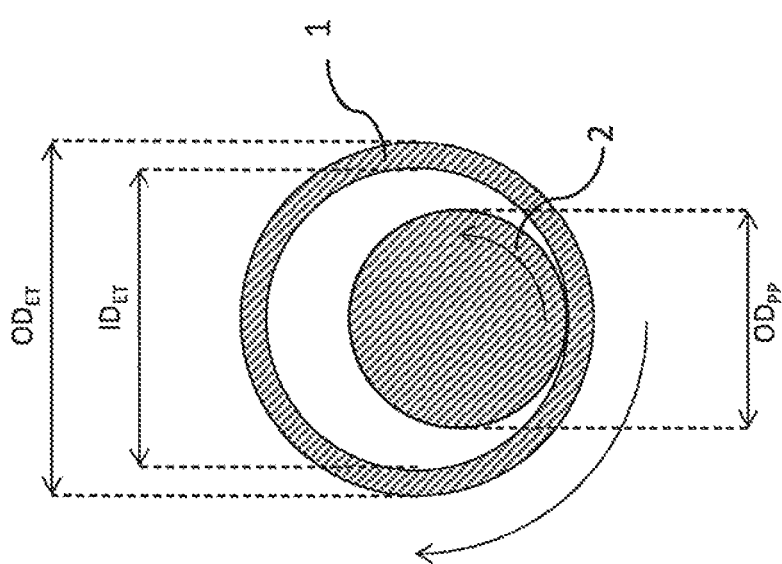
FIG. 1 is a cross-sectional view of a primary preform within an etching tube.

The present invention relates to a plasma etching process to clean the outside surface of a primary preform. In this regard, the following definitions are used in the present description and claims to describe the disclosed subject matter. Other terms not cited (below) are meant to have the generally accepted meaning in the field.

"etching" as used in the present description means: to partly remove the outer surface of a glass object by a chemical process.

"plasma etching" as used in the present description means: an etching process using an etching gas and a plasma; the etching conditions for the etching gas are created or improved in a plasma.

"internally tangent circles" as used in the present description means: two circles, one with a smaller radius that is inside the other with a larger radius, the circles having a single point in common.

"counter rotating" as used in the present description means: rotating in opposite directions with respect to each other. Because the primary preform is present within the etching tube, when the etching tube is rotated clockwise, friction between the two causes rotation of the primary tube in a counterclockwise manner, and vice versa.

"primary preform" as used in the present description means: a solid rod or core rod that is obtained by a vapor deposition process. The term primary preform and core rod are used interchangeably.

"final preform" as used in the present description means: a solid rod obtained by externally providing a primary preform with extra glass (e.g., layers of glass).

"etching tube" as used in the present description means: a hollow cylindrical tube having a cylindrical cavity. This tube is used to hold a primary preform to be etched. This tube can be reused and does not and will not form part of the final preform.

"glass" as used in the present description means: crystalline or vitreous (glassy) oxide material—e.g., silica ($SiO_2$) or quartz—deposited by means of a vapor deposition process.

"silica" as used in the present description means: any substance in the form of $SiO_x$, whether or not stoichiometric, and whether or not crystalline or amorphous, optionally doped.

"the applicator and the etching tube are moved in axial direction with respect to each other" as used in the present description means: the applicator may move in axial direction over the etching tube and/or the etching tube may move in axial direction inside the central aperture of the applicator. In other words, the applicator and the etching tube move axially with respect to each other. The applicator typically moves over the etching tube.

"a plasma that moves in translation back and forth over the length of the etching tube" as used in the present description means: either the movement of the applicator over the etching tube or the movement of the etching tube inside of the central aperture of the applicator so the plasma moves back and forth. Even if the applicator (and hence the plasma within it) is considered stationary and the etching tube moves axially, this is considered to be a plasma moving in translation back and forth according to the present invention. The plasma is formed in part of the open region between the outer surface of the primary preform and the inner surface of the etching tube; it is formed in that part of the open region that is surrounded by the applicator. In other words, the plasma is present inside of the etching tube in the part of the etching tube that is surrounded by the applicator, and the plasma may extend to one (e.g., the pump side) or both sides of the applicator; hence, a plasma may be present within the etching tube outside of the boundaries of the applicator.

"moved back and forth" as used in the present description means: a reciprocating movement or moving backwards and forwards in a straight line.

"pass" as used in the present description means: a part of the etching process defined by one forth and one back movement of the plasma along the length of the etching tube or vice versa. The plasma starts at one end of the available length of the etching tube, moves forth towards a reversal point near the other end of the available length of the etching tube, and then moves back towards the first end to complete one pass. Available length of the etching tube is considered to be the length of the etching tube over which the applicator may move, excluding both ends of the etching tube that are mounted in the clamps of the lathe.

"etching gas" or "fluorine-containing etching gas" as used in the present description means: one or more gaseous fluorine-containing compounds or gases, or a mixture of one or more gaseous fluorine-containing compounds or gases and optionally one or more carrier gases used during the etching process; an etching gas is a gas, which under the appropriate conditions (e.g., temperature and concentration), is capable of removing glass materials through chemical action. Hence, the fluorine-containing etching gas may consist of one or more fluorine-containing gases or the fluorine-containing etching gas may comprise one or more fluorine-containing gases.

"fluorine-containing compound" or "fluorine-containing gas" as used in the present description means: a gaseous compound including at least one fluorine atom bound to a non-fluorine atom (e.g., a fluorinated hydrocarbon of fluorinated sulfur compound). In an embodiment, the fluorine-containing compound is a hydrogen-free fluorinated hydrocarbon, viz., a fluorine-containing compound in which no hydrogen atoms are present, such as wherein all hydrogen atoms have been replaced by fluorine atoms (e.g., a fluorinated carbon compound or a fluorocarbon compound).

"carrier gas" as used in the present description means: a gas that dilutes the concentration of the fluorine-containing compound or gas in the fluorine-containing etching gas, typically without reacting directly with the etching gas.

As noted, the present invention relates to a plasma etching process to clean the outside surface of a primary preform.

In a first step of the preparation of an optical fiber, a primary preform is produced. The processes to prepare such a primary preform are known to those having ordinary skill in the art. For example, a hollow tube (also called substrate tube) may be subjected to an inside vapor deposition process to provide several layers of glass to form a so-called deposited tube, which may be subsequently contracted by heating ("collapsing") into a solid core rod, the primary preform. The substrate tube may also be removed prior to collapsing as discussed in International Publication No. WO 2015/002530 A1, which is hereby incorporated by reference in its entirety. In another embodiment, a mandrel may be subjected to an outside vapor deposition process, after which the mandrel may be removed, after which the deposited layers may be dried and consolidated.

PCVD, MCVD, OVD, or AVD processes may be used during the preparation of a primary preform. During PCVD, electromagnetic radiation is generally directed toward an applicator via a waveguide. The applicator, which surrounds a substrate tube, couples the radiation into the plasma. In an embodiment, the applicator and the substrate tube are surrounded by a furnace to maintain the substrate tube at a temperature of 900-1300° C. during the deposition process. The applicator (and hence the plasma it forms) is moved reciprocally in the substrate tube's longitudinal direction.

In a second step, which is the step to which the method according to the present invention relates, the outer surface of the primary preform or core rod is cleaned to remove surface impurities.

In a third step, the cleaned primary preform thus obtained is converted into a so-called final preform by increasing its diameter through the application of external layer(s) of silica. The primary preform obtained after collapsing and cleaning may thus be externally provided with an additional amount of glass to increase the diameter thereof, such as by means of an external vapor deposition process or direct glass overcladding (so-called "overcladding") or by using one or more preformed glass tubes (so-called "sleeving"), thus obtaining a final preform.

In a fourth step, optical fibers are drawn from the primary preform or the final preform. From the final preform thus produced, one end of which is heated, optical fibers are obtained by drawing on a drawing tower. The refractive index profile of the final preform corresponds to the refractive index profile of the optical fiber drawn from such a preform.

Unfortunately, because of the high temperatures used during the production of a primary preform and/or because of pollution coming from furnaces (e.g., copper from copper elements or iron, tungsten, nickel, and/or chromium from the inoxidizable steel parts of the furnace), as well as from the environment (e.g., pollution present in the gases, such as hydrogen or methane), the outer glass surface of the primary preform is partly contaminated as the pollutants are entrapped in the glass upon cooling and solidifying. This contamination is mainly present on the outer surface or in the outermost glass layers of the primary preform. This contamination may lead to increased attenuation in the optical fiber drawn from this primary preform. The present inventors have observed that contamination by metals, such as copper and iron, is especially detrimental and might lead to a large increase in attenuation of the 1310-nanometer band and/or the 1550-nanometer band.

Methods of chemical wet etching (e.g., using HF) are known. Such wet etching is carried out on the outer surface of the primary preform before an external layer of additional glass is provided. Wet etching is undesirable because HF is a dangerous acid, and HF leaves the surface of the primary preform full of small dents and irregularities.

The present inventors have found a method to remove the contamination by applying an etching procedure at the outside of the primary preform before an external layer of additional glass is provided.

The present invention relates, in a first aspect, to a method for etching a primary preform, the method comprising the steps of (i) introducing the primary preform having an outer diameter $OD_{PP}$ into the central longitudinal cavity of a hollow etching tube having an outer diameter $OD_{ET}$ and an inner diameter $ID_{ET}$ such that in angular direction a part of the outer surface of the primary preform contacts a part of the inner surface of the etching tube (e.g., the respective surfaces touch), thereby forming an open region between a remaining part of the outer surface of the primary preform and a remaining part of the inner surface of the etching tube; (ii) mounting the etching tube with the primary preform inserted in its central longitudinal cavity on a lathe and introducing the etching tube into a central aperture of an applicator mounted on the lathe, wherein the applicator and the etching tube are moved in axial direction with respect to each other; (iii) rotating the etching tube around its axis thereby causing a counter rotation of the primary preform within the etching tube; and (iv) coupling electromagnetic radiation into the applicator and creating within a part of the etching tube that is surrounded by the applicator a plasma that moves in translation back and forth over the length of the etching tube during one or more passes wherein during at least a part of at least one pass the outside of the primary preform is etched by supplying a fluorine-containing etching gas to the open region in order to obtain an etched primary preform.

The solution the present inventors have found to the problems of the prior art is to provide an outside plasma etching process, wherein the primary preform to be etched is present within an etching tube, wherein the etching tube is mounted in a lathe, and wherein a fluorine-containing etching gas is supplied to the open region between the primary preform and the inner surface of the etching tube.

First Phase

The first phase of the present method relates to introducing the primary preform into the central cavity of an etching tube. The primary preform is typically positioned inside of the central cavity of the etching tube.

The open space that is present between the outer surface of the primary preform and the inner surface of the etching tube depends on the difference between the outer diameter of the primary preform ($OD_{PP}$) and the inner diameter of the etching tube ($ID_{ET}$). The open region has a non-annular, cross-sectional shape. When a cross-sectional view is prepared of the primary preform inside of the etching tube, the outer diameter of the primary preform ($OD_{PP}$) and the inner diameter of the etching tube ($ID_{ET}$) are both circles that with respect to each other are internally tangent circles. The open region has a semi-crescent shape, in the meaning that for a true crescent the circles are not internally tangent but at least partly overlapping.

FIG. 1 shows a cross-sectional view of a primary preform 2 inside of an etching tube 1. It is clear from FIG. 1 that the open region has a semi-crescent shape. The arrows indicate the direction of rotation during operation.

In an embodiment, the difference between the outer diameter of the primary preform $OD_{PP}$ and the inner diameter of the etching tube $ID_{ET}$ (i.e., $ID_{ET}$–$OD_{PP}$) is at least 4 millimeters (e.g., at least 6 millimeters) in order to ensure sufficient gas flow between the outer diameter of the primary preform and the inner diameter of the etching tube.

In another embodiment, the difference between the outer diameter of the primary preform $OD_{PP}$ and the inner diameter of the etching tube $ID_{ET}$ (i.e., $ID_{ET}$–$OD_{PP}$) is at most 15 millimeters (e.g., at most 10 millimeters) in order to ensure sufficient etching efficiency. When the difference increases, etching will take place increasingly at the surface of the etching tube compared with the primary preform, thereby decreasing the efficiency of the process.

In yet another embodiment, the primary preform to be etched is introduced into the central cavity of the etching tube so that this primary preform is freely moved inside of the etching tube and is in contact with part of the inner surface of the etching tube. The primary preform is hence present non-coaxially within the cavity of the etching tube.

In yet another embodiment, the etching tube has a length $L_{ET}$, the primary preform has a length $L_{PP}$, and $L_{PP}<L_{ET}$. Typically, the reversal points (i.e., the points between which the plasma moves back and forth in translation) are set in such a manner that the full length of the primary preform is etched but typically not more than the full length of the primary preform if the length of the etching tube is significantly longer than the length of the primary preform. During the process, the primary preform may tend to move axially inside of the etching tube (e.g., towards the discharge side). This movement may be prevented by the presence of a fixating mechanism, such as a fixing bar present on the inside of the etching tube. A fixing bar (e.g., a longitudinal glass bar) can have a diameter smaller than the inner diameter of the etching tube but sufficiently large to prevent the primary preform from moving over the fixing bar. Alternatively, the fixating mechanism can include a tube having an inner diameter smaller than primary preform's outer diameter.

Second Phase

The second phase of the present method relates to the mounting of the hollow etching tube with the primary preform inserted in its central longitudinal cavity. The etching tube may be clamped in a lathe and should be mounted such that it extends through the central aperture of the applicator mounted on the lathe. This will ensure that a plasma may be formed inside of the etching tube. In an embodiment, the etching tube consists of one material. In another embodiment, the etching tube is a silica ($SiO_2$) tube (e.g., a quartz tube). In yet another embodiment, the etching tube is an alumina ($Al_2O_3$) tube.

In an embodiment, the inner surface of the etching tube is inert to the etching gas, viz., made of a material inert to etching, such as alumina (at certain temperatures) or carbide. This will ensure that the inner surface of the etching tube is not etched. When the inner surface of the etching tube is etched, the wall thickness will decrease and so will its lifespan.

In an embodiment, the etching tube has a wall that includes at least two layers, an outer layer of a first material and an inner layer of a second material. In another embodiment, the first material and the second material are the same. In another embodiment, the first material and the second material are different materials. In yet another embodiment, the first material is silica glass. In yet another embodiment, the second material is a material inert to etching, such as alumina or carbide.

Third Phase

The third phase of the present method relates to both rotating the etching tube and to the etching process. The rotation may be started before, simultaneously with, or after the etching starts. Typically, the rotation is continued until the end of the etching process.

The etching is performed by supplying a fluorine-containing etching gas into the etching tube and by coupling electromagnetic radiation into the applicator to create a plasma within a part of the etching tube that is surrounded by the applicator. The applicator and the plasma move in translation back and forth over the length of the etching tube during one or more passes.

The etching tube is rotated around its axis with a certain rotational speed. The rotating of the etching tube effects a counter rotating of the primary preform by friction of the inner surface of the etching tube and the outer surface of the primary preform. This friction does not significantly contribute to the removal of glass from the outside of the primary preform.

Figure 2:
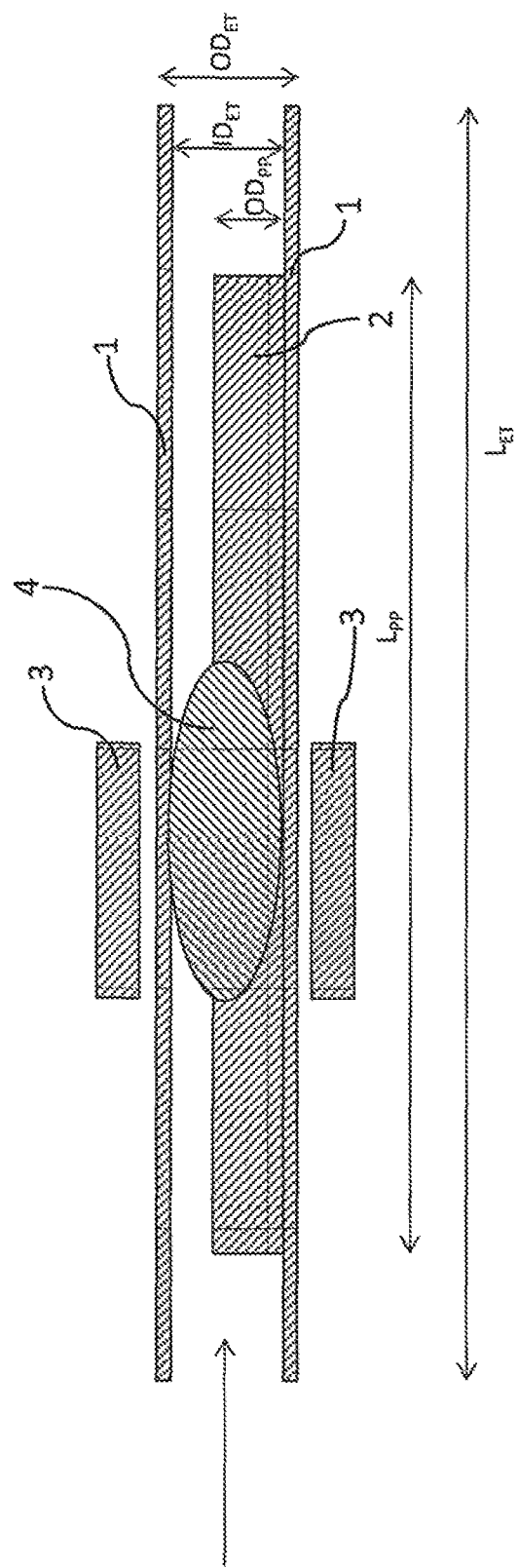
FIG. 2 is a longitudinal sectional view of a configuration according to the present invention.

FIG. 2 schematically shows a side sectional view of a configuration according to the present invention. An applicator 3 is shown in which an etching tube 1 is introduced. The primary preform 2 is present inside of the etching tube 1. A plasma 4 is generated inside of the etching tube 1 in the region where the applicator 3 surrounds the etching tube 1. Shown in FIG. 2 are the outer diameter $OD_{ET}$ of the etching tube 1, the inner diameter $ID_{ET}$ of the etching tube 1, and the outer diameter $OD_{PP}$ of the primary preform 2, as well as the length $L_{PP}$ of the primary preform 2 and the length $L_{ET}$ of the etching tube 1. The arrow shows the direction of the gas flow through the etching tube 1.

The etching tube is typically rotated around its axis with a rotational speed of at least 0.2 revolution per second, typically at least 0.5 revolution per second, such as between 1 and 4 revolutions per second (e.g., 2 revolutions per second). In other words, there are typically between 12 and 120 revolutions per minute (e.g., 30 revolutions per minute), or between 60 and 320 per minute. This will ensure a good balance between preventing inhomogeneity of the etching (e.g., if the rotation is too slow) and preventing slipping (e.g., if the rotation is too fast).

The rotating of the etching tube may be continuous or stepwise. In an embodiment, the etching tube rotates once every pass or twice every pass. In another embodiment, the etching tube is rotated by 45° to 180° each step, such as between 80° and 120° each step. In a specific embodiment, the etching tube is rotated at each reversal point (viz., two rotation steps per pass) with between 80° and 120° each step (e.g., 90° or 100° each step). The extent to which the rotational speed is transferred to the primary preform depends on several factors, such as the rotation speed of the etching tube and the friction between the primary preform and the etching tube. The rotational speed of the primary preform may be visually observed and its rotational speed may be increased by increasing the rotational speed of the etching tube. The rotating of the primary preform ensures the best rotational homogeneity.

In an embodiment, the method includes at least ten passes of the plasma, such as between 50 and 200 plasma passes. The number of plasma passes is not limiting, however, and depends on the amount of silica to be removed by etching and the amount removed by one pass. In this way, the number of plasma passes may be calculated.

In an exemplary embodiment, at least 0.1 millimeter, typically at least 0.2 millimeter, more typically at least 0.3 millimeter is removed from the outside diameter of the primary preform. Based on the desired reduction in diameter, the outer diameter of the primary preform before etching, and the length of the primary preform, the amount of silica to be removed can be calculated. Then, based on that calculation, the settings for the process can be prepared, such as the pressure, the power of the plasma, the amount of etching-gas, the translation speed, and the number of passes.

In an embodiment, the translation speed of movement is between 1 and 40 meters/minute, more typically between 10 and 30 meters/minute (e.g., about 20 meters/minute).

In an embodiment, the power of the electromagnetic radiation is between 3 kW and 10 kW, or between 4 kW and 9 kW, typically between 5 kW and 8 kW (e.g., 6 kW). In an embodiment, the width of the plasma zone is between 100 and 250 millimeters, typically between 150 and 200 millimeters.

A plasma is normally generated only in a part of the etching tube (e.g., the part that is surrounded by the applicator), referred to as a plasma zone. Typically, the dimensions of the applicator are smaller than the respective dimensions of the furnace and the etching tube. Only at the position of the plasma are the fluorine-containing gases converted into reactive species that can achieve the etching of the outer surface of the primary preform.

The applicator induces a plasma within part of the length of the etching tube, and the plasma is typically located in the middle of the applicator (i.e., axially). Such a plasma usually has a length of between 5 and 20 centimeters, typically between 7 and 15 centimeters, depending on the furnace used.

In an embodiment, the method according to the present invention includes a furnace, which surrounds both the applicator and etching tube. The applicator moves in translation back and forth over the etching tube within an area covered entirely by this furnace. The furnace heats at least the area of the etching tube in which the primary preform is placed. To increase the effect of the etching process with the fluorine-containing gas, the temperature of the furnace is at least 1000° C., typically at least 1100° C.

In an embodiment, there is no furnace present surrounding the applicator, and the temperature is room temperature (e.g., about 20° C.). In another embodiment, a furnace is present surrounding the applicator but the furnace is not active, viz., at room temperature. When the plasma is effected, this might lead to an increase in the temperature of the etching tube and optionally the primary preform. The present inventors have observed that the etching tube can reach a temperature of around 500° C. because of the plasma.

In yet another embodiment, the process according to the present invention is carried out using cooling in order to counter (at least partially) the temperature increase effected by the plasma.

The process of etching will take place by disassociation of the fluorine-containing gas to fluorine ions. Without wishing to be bound by any theory, the inventors presume that these fluorine ions will react with the silica on the outer surface of the primary preform to form $SiF_4$ and $CO_2$. In other words, $SiO_2$ is removed from the outer surface of the primary preform and any impurities that are present inside of that glass will be freed and will be carried out with the stream of gas (e.g., glass and impurities are removed from the outer surface and outer glass layers of the primary preform.)

The concentration of the fluorine-containing compound in the etching gas and the temperature at which the gas flows across the outer surface of the primary preform affects the rate at which the etching gas removes the deposited oxide material and/or contaminated region. Typically, the combination of the temperature and concentration of the fluorine-containing compound in the etching gas is sufficient to allow for a rapid etching rate (removal rate) of the deposited oxide material, which favorably results in decreasing the processing time.

In an embodiment, the fluorine-containing etching gas is supplied during at least part of at least one pass, typically during one or more complete passes. In another embodiment, the fluorine-containing etching gas is supplied during at least part of at least one pass, and the one or more carrier gases are supplied during the complete pass(es). This may be carried out by a valve in the line supplying the fluorine-containing gas. The fluorine-containing gas may be supplied by using a gas supply line including piping with a valve (e.g., an electric valve) containing an orifice. The valve may be controlled by a microcontroller. When a carrier gas is used, usually there is a separate gas line and a valve for the carrier gas. A mass flow controller (MFC) may regulate the flow of gas(es).

If it is observed that there is a non-uniform distribution of impurities over the length of the primary preform (e.g., when there are more impurities near one or both ends), it is possible to preferentially etch (e.g., when the applicator is at or near a primary-preform end with higher concentrations of impurities). For example, this can be implemented via one or more passes with etching (and thus with a supply of etching gas or fluorine-containing gas) during the complete pass(es) and one or more passes with only partial etching.

In an embodiment, the fluorine-containing gas is selected from $CCl_2F_2$, $CF_4$, $C_2F_6$, $C_4F_8$, $SF_6$, $NF_3$, $SO_2F_2$, $CHF_3$, $CClF_3$, and $CCl_3F$, and one or more combinations thereof. The fluorine-containing gas is typically $C_2F_6$.

In an embodiment, the fluorine-containing etching gas includes a fluorine-containing compound/gas and a carrier gas. In another embodiment, the fluorine-containing etching gas includes two or more fluorine-containing compounds and a carrier gas. In yet another embodiment, the fluorine-containing etching gas includes a fluorine-containing compound/gas and two or more carrier gases. In yet another embodiment, the fluorine-containing etching gas includes two or more fluorine-containing compounds/gases and two or more carrier gases.

In an embodiment, the carrier gas is selected from oxygen ($O_2$), nitrogen ($N_2$), and argon (Ar), and one or more combinations thereof. In an embodiment, the carrier gas is oxygen ($O_2$).

In an embodiment, the fluorine-containing etching gas includes $C_2F_6$ as the fluorine-containing compound and $O_2$ as the carrier gas.

When a fluorocarbon compound (fluorinated carbon compound) is used in an etching gas, deposition of elemental carbon may occur. Without wishing to be bound by a theory, the inventors propose that the fluorine atoms of the etching gas take care of the etching process and the carbon atoms of the etching gas are deposited on the inside surface of the etching tube. Sometimes a black film is observed on the inside surface of the etching tube. Using oxygen ($O_2$) as a carrier gas is preferred when a fluorocarbon compound is used. The oxygen has been found by the present inventors to react with the carbon part of the etching gas to prevent carbon (C) deposition.

The fluorine-containing gas may be present in the open region or space between the inner surface of the etching tube and the outer surface of the primary preform over the length of the plasma. Any fluorine-containing gas that is not activated to provide an etching effect will be removed from the furnace together with any gases formed during the etching process (such as $CO_2$ and $SiF_4$) (e.g., by a decreased pressure duct or a vacuum pump connected to the etching tube). This will ensure safe removal of any hazardous gases. A gas scrubber may be present at the pump side.

The fluorine-containing gas is typically supplied in an amount of at least 100 sccm (standard cubic centimeter per minute) under standard conditions (20° C. and 1 atmosphere), more typically at least 150 sccm (e.g., 200 sccm or more).

The total gas flow (either pure fluorine-containing gas(es) or a mixture of fluorine-containing gas(es) and a carrier gas) is at least 1 slm (standard liter per minute), typically at least 2 slm (e.g., at least 3 slm), more typically between 3 and 5 slm (e.g., 4 slm).

An exemplary process according to the present invention typically uses a so-called low-pressure plasma, being between 1 mbar and 100 mbar (e.g., below 50 mbar), typically between 5 mbar and 20 mbar (e.g., 10 mbar). Typically, the reduced pressure is maintained by a vacuum pump.

In an embodiment, the etching process provides a primary preform having a reduced diameter as compared with a primary preform that has not been etched. In other words, the etching removes glass (silica) and impurities from the outer surface of the primary preform and decreases its outer diameter. The amount of material removed by etching depends on several factors, such as the source of the electromagnetic radiation, the amount of gases used, and the pressure inside of the etching tube. For example, decreased pressure can create increased plasma length, which can increase etching.

The processes according to the present invention are suitable for primary preforms prepared to produce multi-mode optical fibers or single-mode optical fibers. Thus, the present invention relates to an etched primary preform obtained by or obtainable by the present method. The present invention also relates to multimode optical fibers or single-mode optical fibers obtained therefrom.

The present methods do not require significant changes to an instrumental setup or an apparatus that is already in use. Therefore, the inventors' solutions are easy and cost-effective to implement.

Aspects of the present invention will now be illustrated in the following non-limiting examples, which are provided for the sake of illustration and which are not intended to limit the scope of the present invention.

EXAMPLES

In order to demonstrate an exemplary concept of the present invention, respective core rods were subjected to etching with an etching gas at increased temperature and at room temperature.

Example 1

A silica etching tube having an outer diameter of 46 millimeters and an inner diameter of 41 millimeters was introduced into a lathe. A multimode primary preform having an outer diameter of 33 millimeters was introduced into the etching tube. Etching was carried out with a furnace at a temperature of 1100° C. The applicator was moved within the furnace over the primary preform with a translation speed of 20 meters per minute. The power of the electromagnetic radiation was 6 kW. The etching tube was rotated twice per pass with 100° per rotation step. The etching was carried out with an etching-gas mixture of Freon gas ($C_2F_6$) at 200 sccm and oxygen at 3 slm. The remaining gases were removed by means of a line having a reduced pressure of approximately 10 mbar. After 30 minutes, the process was stopped and the primary preform was removed. The primary preform was reweighed and was 60 grams lighter. The etching tube was also weighed and, as expected, showed etching (viz., 200 grams removed).

Example 2

A silica etching tube having an outer diameter of 46 millimeters and an inner diameter of 41 millimeters was introduced into a lathe. A multimode primary preform having an outer diameter of 33 millimeters was introduced into the etching tube. Etching was carried out at room temperature (21° C.) without an active furnace (i.e., the furnace was not switched on). The applicator was moved within the furnace over the primary preform with a translation speed of 2 meters per minute. The power of the electromagnetic radiation was 6 kW. The etching tube was rotated continuously at a frequency of 0.5 rotations per second (30 rotations per minute). The etching was carried out with an etching-gas mixture of Freon gas ($C_2F_6$) at 1000 sccm and oxygen at 1 slm. The remaining gases were removed by means of a line having a reduced pressure of approximately 90 mbar. After 30 minutes, the process was stopped and the primary preform was removed. The primary preform was reweighed and was 18 grams lighter. The etching tube was also weighed and, as expected, showed etching (viz., 22 grams removed).

The two examples (above) demonstrate that etching can be carried out either with or without using external heating (e.g., a furnace). The two examples also show that etching can be carried out with different translation speeds and different pressures. The two examples also demonstrate that the amount of material removed may be targeted by tuning the conditions (e.g., temperature, translation speed, and pressure). The two examples also show that, as compared with the amount of material removed from the etching tube, the amount of material removed from the primary preform may be targeted by tuning the conditions (e.g., temperature, translation speed, and pressure). The two examples (above) demonstrate the efficacy of the processes according to the present invention.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for etching a primary preform, the method comprising the steps of:
   introducing the primary preform having an outer diameter $OD_{PP}$ into the central cavity of a hollow etching tube having an outer diameter $OD_{ET}$ and an inner diameter $ID_{ET}$ such that a part of the outer surface of the primary preform contacts a part of the inner surface of the etching tube, thereby forming an open region between a remaining part of the outer surface of the primary preform and a remaining part of the inner surface of the etching tube;
   mounting the etching tube with the primary preform inserted in its central cavity on a lathe and introducing the etching tube into a central aperture of an applicator mounted on the lathe, wherein the applicator and the etching tube are moved in axial direction with respect to each other;
   rotating the etching tube around its axis thereby causing a counter rotation of the primary preform within the etching tube; and
   coupling electromagnetic radiation into the applicator and creating within a part of the etching tube that is surrounded by the applicator a plasma that moves in translation back and forth over the length of the etching tube during one or more passes, wherein during at least a part of at least one pass the outside of the primary preform is etched by supplying a fluorine-containing etching gas to the open region in order to obtain an etched primary preform.

2. The method according to claim 1, wherein the difference between the outer diameter of the primary preform $OD_{PP}$ and the inner diameter of the etching tube $ID_{ET}$ ($ID_{ET}-OD_{PP}$) is at least 4 millimeters.

3. The method according to claim 1, comprising at least ten passes.

4. The method according to claim 1, wherein the fluorine-containing etching gas is supplied during at least one complete pass.

5. The method according to claim 1, wherein the fluorine-containing etching gas comprises $CCl_2F_2$, $CF_4$, $C_2F_6$, $C_4F_8$, $SF_6$, $NF_3$, $SO_2F_2$, $CHF_3$, $CClF_3$, and/or $CCl_3F$.

6. The method according to claim 1, wherein the fluorine-containing etching gas is $C_2F_6$.

7. The method according to claim 1, wherein the fluorine-containing etching gas comprises a fluorine-containing gas mixed with one or more carrier gases.

8. The method according to claim 1, wherein the fluorine-containing etching gas comprises argon and/or oxygen.

9. The method according to claim 1, wherein the applicator and the etching tube are moved in axial direction with respect to each other with a translation speed of between 1 and 40 meters/second.

10. The method according to a claim 1, wherein the rotation of the etching tube is a continuous rotation or a stepwise rotation.

11. The method according to claim 1, wherein the rotation speed of the etching tube is between 0.1 and 2 rotations per pass.

12. The method according to claim 1, wherein the power of the electromagnetic radiation is between 3 kW and 10 kW.

13. The method according to claim 1, wherein the length of the etching tube $L_{ET}$ is greater than the length of the primary preform $L_{PP}$ ($L_{ET}>L_{PP}$).

14. The method according to claim 1, wherein the etching tube is a silica tube.

15. The method according to claim 1, comprising increasing the diameter of the etched primary preform through the application of an external layer of silica to form a final preform.

16. The method according to claim 1, comprising drawing the final preform into an optical fiber.

17. A method for etching a primary preform, comprising:
   providing a primary preform having an outer diameter $OD_{PP}$ positioned within the central cavity of an etching tube having an inner diameter $ID_{ET}$, wherein (i) the etching tube's inner diameter $ID_{ET}$ is greater than the primary preform's outer diameter $OD_{PP}$ and (ii) part of the primary preform's outer surface is in contact with part of the etching tube's inner surface thereby forming an open etching region between a remaining part of the primary preform's outer surface and a remaining part of the etching tube's inner surface;
   rotating the etching tube around its axis to counter rotate the primary preform within the etching tube;
   translating a plasma back and forth over the etching tube's length in one or more plasma passes; and
   during at least a part of at least one plasma pass, supplying a fluorine-containing etching gas to the open etching region to etch the outside of the primary preform.

18. The method according to claim 17, coupling electromagnetic radiation into an applicator that surrounds the etching tube to create the plasma, wherein the applicator and the etching tube are moved in axial direction with respect to each other to thereby translate the plasma back and forth over the etching tube's length.

19. The method according to claim 17, wherein the step of rotating the etching tube around its axis comprises continuously rotating the etching tube around its axis to continuously counter rotate the primary preform within the etching tube.

20. The method according to claim 17, wherein the step of rotating the etching tube around its axis comprises stepwise rotating the etching tube around its axis to stepwise counter rotate the primary preform within the etching tube.

* * * * *